United States Patent [19]

Schörghuber

[11] 4,402,850
[45] Sep. 6, 1983

[54] METHOD OF PRODUCING A LIQUID AGENT FOR IMPROVING THE QUALITY OF CONTAMINATED WATER

[76] Inventor: Karl P. Schörghuber, Linz/Zaubertal, Lärchenau 11, Austria

[21] Appl. No.: 317,812

[22] Filed: Nov. 3, 1981

[51] Int. Cl.³ ............................ C02F 5/02; C02F 5/08
[52] U.S. Cl. ................................... 252/175; 252/181; 210/702; 210/723; 210/724; 210/716; 423/155; 423/158; 423/190; 423/205; 423/208
[58] Field of Search ............... 252/175, 178, 179, 181, 252/84, 85, 86, 87; 210/702, 723, 724, 716; 423/155, 158, 190, 205, 208

[56] References Cited

U.S. PATENT DOCUMENTS

| | | | |
|---|---|---|---|
| 1,563,613 | 12/1925 | Dolbear | 423/190 |
| 2,412,560 | 12/1946 | Bolton | 423/208 |
| 2,496,290 | 2/1950 | Hampel | 423/208 |
| 3,751,559 | 8/1973 | Kanno et al. | 423/158 |
| 3,904,520 | 9/1975 | Daney | 210/716 |
| 4,162,297 | 7/1979 | Aubry et al. | 423/158 |
| 4,336,232 | 6/1982 | Moritz | 210/726 |

FOREIGN PATENT DOCUMENTS 324967 8/1972 Austria.

Primary Examiner—John E. Kittle
Assistant Examiner—Hoa Van Le
Attorney, Agent, or Firm—Martin A. Farber

[57] ABSTRACT

A method is disclosed of producing a liquid agent for improving the quality of contaminated water, particularly water in pools, natural bodies of water and waste waters, characterized by introducing with agitation comminuted rock-salt clay or a mixture thereof with rock-salt deads into an aqueous solution or suspension of an inorganic base, stirring the resultant mixture for 2 to 5 (preferably 3) hours, thereupon adjusting the pH of the resultant solution to a value of between 7.5 and 10.5 (and preferably between 9.5 and 10.5) by means of the addition of acid or alkali, and removing undissolved portions from the solution.

12 Claims, No Drawings

METHOD OF PRODUCING A LIQUID AGENT FOR IMPROVING THE QUALITY OF CONTAMINATED WATER

The present invention relates to a method of producing a liquid agent for improving the quality of contaminated water, particularly water in pools, natural bodies of water and waste waters.

Numerous agents are known for improving the quality of water such as water in pools, bathing lakes and waste waters. These known agents not only require careful supervision and great care upon use but also encounter objections since they frequently contain corrosive and poisonous chemicals which may lead to impairment of health when improperly dosed.

From Australian Pat. No. 324 967 an agent for the purification of contaminated water is known which has a base of an alkaline aqueous solution or suspension of inorganic salts. However, the patent contains no indication as to how the known agent can be produced.

The object of the present invention is to provide a simple method of producing an agent of the aforementioned type which can find universal use but which is based on substances which occur in nature.

This result is achieved in accordance with the invention by introducing comminuted rock-salt clay or a mixture thereof with rock-salt deads into an aqueous solution or suspension of an inorganic base with agitation, stirring the resultant mixture for 2 to 5 and preferably 3 hours, thereupon adjusting the pH of the resultant solution to a value of between 7.5 and 10.5, and preferably between 9.5 and 10.5, by addition of acid or alkali and separating the solution from undissolved components.

The method of the invention not only proceeds from cheap raw materials but is also extremely simple. Thus the concentrations of the reactants (rock-salt clay and possibly rock-salt deads as well as the base) are not critical. Simple preliminary tests are sufficient in order to determine the optimum quantitative proportions and minimum amounts. Since the agent produced in accordance with the invention is a solution, a possible excess of one of the reactants is not disturbing since it simply remains unreacted in the residue.

An aqueous solution or suspension of a pH of more than 10 and preferably more than 12 is preferably used.

Particularly when starting with rock-salt deads it is advisable to introduce into the solution solid materials (rock-salt clay, rock-salt deads or mixtures thereof) whose content of NaCl is between 20 and 80 wt%. Before adjusting the pH to a desired final value it is advisable in this case to increase the content of NaCl in the solution to the desired value of 14 g of NaCl per liter of solution by the addition of ordinary salt and possibly adding ordinary salt in the form of an aqueous solution, for instance untreated brine, of a concentration of preferably 28% NaCl.

The base used for the method of the invention is not critical. Calcium oxide, calcium carbide and sodium hydroxide have been found to be particularly suitable.

The rock-salt clay used for the invention is a breccious mixture of clays, salt and gypsum such as is found in particular in the Salzkammergut region and in the Berchtesgaden Alps. Rock-salt deads are the residue obtained after the leaching of the salt, it differing from rock-salt clay essentially by the a content of sodium chloride or the absence thereof.

A few analyses of two samples of rock-salt clay drill cuttings from deep drillings in the Salzberg Mountain at Hallstatt) are given below:

SAMPLE 1

$H_2O$-soluble portion (10 g of sample/500 ml distilled $H_2O$) about 63% consisting of:

|            | %      |                     | %      |
|------------|--------|---------------------|--------|
| $Ca^{++}$  | 3.778  | $CaSO_4$            | 12.833 |
| $Mg^{++}$  | 0.244  | $MgCl_2$            | 0.957  |
| $SO_4^{--}$| 9.477  | $Na_2SO_4$          | 0.623  |
| $Cl^-$     | 52.455 | NaCl                | 84.725 |
| $K^+$      | 0.386  | KCl                 | 0.736  |

$H_2O$-insoluble portion (10 g of sample/500 ml distilled $H_2O$) about 37%, consisting of:

|              | %      |
|--------------|--------|
| CaO          | 0.350  |
| MgO          | 9.325  |
| $SO_3$       | 0.729  |
| $K_2O$       | 12.494 |
| $SiO_2$      | 49.740 |
| Sesquioxides | 27.215 |

SAMPLE 2

$H_2O$-soluble portion (10 g of sample/500 ml distilled $H_2O$) about 33%, consisting of:

|            | %      |            | %      |
|------------|--------|------------|--------|
| $Ca^{++}$  | 5.602  | $CaSO_4$   | 19.028 |
| $Mg^{++}$  | 1.279  | $MgCl_2$   | 5.009  |
| $SO_4^{--}$| 15.101 | $Na_2SO_4$ | 2.476  |
| $Cl^-$     | 48.039 | NaCl       | 72.181 |
| $K^+$      | 0.580  | KCl        | 1.196  |

$H_2O$-insoluble portion (10 g of sample/500 ml distilled $H_2O$) about 67%, consisting of:

|              | %      |
|--------------|--------|
| CaO          | 0.736  |
| MgO          | 7.939  |
| $SO_3$       | 0.986  |
| $K_2O$       | 10.918 |
| $SiO_2$      | 51.160 |
| Sesquioxides | 27.810 |

The average composition (mean values of 14 analyses with alkali determination) of the Alpine salt clays contained in the rock-salt clay can be noted from the following Table I.

TABLE I

| | Designation of Rock | | | | | | |
|---|---|---|---|---|---|---|---|
| | Group of the Black Salt Clays | | | Group of the Green to Grey Salt Clays | | | |
| | Black anhydrous salt clays | Black | Greenish-black | Green | Greyish-green | Gray Salt Clay Hall in the Tyrol | Hallein |
| $Al_2O_3$ | 15.80 | 17.50 | 18.85 | 20.21 | 22.20 | 16.75 | 19.80 |
| $SiO_2$ | 45.24 | 43.20 | 46.00 | 49.20 | 50.34 | 61.65 | 52.86 |
| MgO + CaO | 16.28 | 15.60 | 12.16 | 10.80 | 9.36 | 7.82 | 10.10 |
| (KNa)O | 3.12 | 4.48 | 5.19 | 4.01 | 4.41 | 3.14 | 4.04 |
| $Fe_2O_3$ + FeO | 5.60 | 7.00 | 7.20 | 7.33 | 8.53 | 5.81 | 5.96 |
| % Total | 86.04 | 87.78 | 89.40 | 91.55 | 94.84 | 95.17 | 93.36 |
| Mineral Components (Mean Values) | | | | | | | |
| Alumina-alkali silicates | 42.36 | 49.01 | 56.65 | 60.60 | 60.73 | 47.93 | 55.61 |
| Mg—hydrosilicate | 16.76 | 17.80 | 17.49 | 16.70 | 17.65 | 14.98 | 18.50 |
| Quartz | 14.98 | 9.62 | 7.77 | 8.29 | 10.39 | 29.12 | 14.80 |
| Anhydrite | 16.16 | 4.82 | 1.94 | 1.28 | 0.94 | 1.24 | 1.36 |
| Calcite | — | — | — | — | 0.75 | 0.92 | — |
| Dolomite | — | 0.82 | 0.29 | 0.40 | — | — | — |
| Magnesite | 4.20 | 10.93 | 7.06 | 5.17 | 0.95 | — | 5.63 |
| Total of the Fe—oxides and secondary components | 5.60 | 7.00 | 8.81 | 7.56 | 8.69 | 5.81 | 6.59 |
| % Total | 100.00 | 100.00 | 100.00 | 100.00 | 100.00 | | |
| Density | 2.77 | 2.75 | 2.74 | 2.73 | 2.77 | 2.78 | 2.75 |

It is advantageous to use in the method of the invention rock-salt clay whose content of sodium chloride amounts to 20 to 80% and preferably between 30 and 50%. It has been found particularly suitable for the content of sodium chloride to be about 40%.

If the content of sodium chloride present in the available rock-salt clay is too high, it is possible to use a rock-salt clay which has been mixed with rock-salt deads. Rock-salt deads is the residue remaining upon the recovery of sodium chloride by the leaching process and has, for instance, the analysis of a rock salt from the Rotsalz (red salt) Mountains of Hallstatt indicated in Table II.

TABLE II

| Water soluble: | 6.73% | including 3.70% NaCl* |
|---|---|---|
| Water insoluble: | 93.27% | (separated at 120° C.) |
| Density: | 2.67% | |
| $SiO_2$ | 49.72% | |
| $Al_2O_3$ | 20.50% | |
| $Fe_2O_3$ | 8.00% | |
| CaO | 0.91% | |
| MgO | 10.59% | |
| $H_2O$ } $Na_2O$ | 4.50% | |
| $CO_2$ | 1.19% | |
| $SO_3$ | 0.74% | |
| $H_2O$ | 3.84% | |

*can increase up to 15% (with 18% water-insoluble).

The chemical composition of rock-salt deads corresponds to the chemical composition of the Alpine salt clays, as indicated in Table III below.

TABLE III

| Chemical composition of Alpine salt clays (in ranges) | | |
|---|---|---|
| | Illite | Alpine salt clays |
| $SiO_2$ | 44–52.5% | 42.5–53% |
| $Al_2O_3$ | 21.5–32.8% | 17.4–23% |
| $Fe_2O_3$ } FeO | 2.3–6.2% | 5.6–8% |
| MgO | 1.3–3.9% | 8.0–13.5% |
| CaO | 0.0–0.9% | 0.3–2.3% |

TABLE III-continued

| Chemical composition of Alpine salt clays (in ranges) | | |
|---|---|---|
| | Illite | Alpine salt clays |
| $Na_2O$ | 0.1–0.9% | 0.1–2.5% |
| $K_2O$ | 4.8–7.7% | 2.8–5.1% |
| MnO | 0–0.1% | |
| $TiO_2$ | 0–0.7% | |
| $H_2O$ | 8.5% | 1.8–5.8% |

For the method of production in accordance with the invention one proceeds in the following manner:

1. The base (quicklime, calcium carbide, caustic soda) is gradually introduced into water, the pH of the resultant solution or suspension should be more than 12.

2. Rock-salt clay is added, for instance in the form of drill cuttings, to this strongly alkaline solution. Instead of drill cuttings rock-salt deads or a mixture thereof can also be used. The amount added depends on the sodium-chloride content of the solids, which content may be between 0% (rock-salt deads) and 20–80% (rock-salt clay). More rock-salt clay can be used the higher its NaCl content (the lower its silicate content) is.

3. The mixture obtained in this manner is stirred for about 2 to 4 hours in order to activate the clays.

4. In order to improve the electrolytic properties, particularly when there is a high proportion of rock-salt deads (i.e. a low NaCl content of the solids introduced above in accordance with item 2), crude brine (28% NaCl) is added. As a whole, about 14% NaCl should finally be present in the solution.

5. After having stirred again for one to three hours and possibly also diluted with water—this in particular if less water was originally used—the pH is brought to 9.0 to 11.0, and preferably 9.5 to 10.5, by means of base or acid (for instance hydrochloric acid).

6. After the settling out of the undissolved portions (time required: 5 to 10 hours), the supernatant colorless, clear solution is poured off.

The agent prepared in accordance with the invention has excellent properties and its use permits noticeable optimalization of the treatment of water and the quality of the water. Referred in particular to the field of water treatment, a substantial improvement in the flocculation as a whole can be noted; together with this the chlorine content of pool water in public pools requiring chlorine treatment can be reduced, while assuring an excellent quality of the water, down to a value of about 50% of the quantity previously employed, which beyond any doubt represents a welcome step in the direction of low-chlorine and thus more pleasing pool waters.

In order to test the effectiveness of the agent prepared in accordance with the invention, the treatment of pool water with traditional agents and with the agent produced in accordance with the invention was compared. The agent prepared in accordance with Example 1 was used, it being referred to hereinbelow simply as the "agent."

1.100 PRELIMINARY TESTS

In order to check the effectiveness of the agent, examinations consisting of the following were carried out in the laboratory as basis for the subsequent tests:

1.110 REDUCTION IN INJURIOUS SUBSTANCES

For this purpose a solution which contained defined amounts of phosphate and nitrate was treated with increasing quantities of the agent and the phosphate and nitrage contents in the filtrate determined as compared with a control sample after different times of reaction (at room temperature) and after fine filtration (Blauband) for the removal of the flakes formed.

It was possible to establish that the content of phosphate as well as nitrate in the filtered liquid was reduced by an amount of about 40% as compared with the test solution.

This effect is known as "refining" in water treatment, and can be explained in the manner that, as is known, hydrated oxide particles such as those of iron and/or aluminum as well, for instance, as activated silica possess, in freshly flocculated condition, a large energy-rich surface on which dissolved substances can be deposited by adsorption (adsorbates).

A comparable reduction of phosphate and nitrate could not be noted when using aluminum sulfate or iron chloride.

1.120 INFLUENCE ON FLOCCULATION

The agent has inherent flocculating properties which however, in combination with a suitable flocculating agent, in this case with a so-called polyaluminum hydroxy chloride (PAC), shows a surprising improvement in the flocculation—beyond that of the aluminum hydroxy chloride.

Aside from the fact that the flocculation in itself is substantially accelerated, the coagulation furthermore appears to be even substantially more intense, even when only 0.3 ml/m$^3$ is used.

As compared with this, the commercial liquid flocculating agents having a base of PAC call for between 0.5 and 1.0 ml/m$^3$ in accordance with their product literature.

The agent is thus comparable with respect to its influence flocculation, to a "synergistic intensifier" (activator, promoter). The residual amount of sodium chloride, which acts as electrolyte, is in this case certainly also of essential importance particularly as the coagulation, and therefore the agglomerating of colloidal particles to form larger aggregates, can be noticeably activated, specifically upon the addition of an electrolyte.

2.000 RANGE OF USE

2.100 PREREQUISITES

The indoor pool selected for the testing purposes is owned by the Municipality and open to the public. It was opened for public use at Easter of 1974. It is located a few kilometers from the state capital city of Salzburg and is one of the most popular within a wide area. This on the one hand due to the ease of reaching it but on the other hand also because of its good design both with respect to the bathing house and with respect to the treatment of the water. Mention should also be made of its excellent careful management.

2.110 HYDRAULIC CONDITIONS

The tank which is made of stainless steel (V$_2$A) has dimensions of about 25×12 m, its bottom sloping from a depth of about 0.9 m to 1.8 m. Its area is thus about 300 m$^2$ and its volume about 400 m$^3$.

Circulation is assured by three pumps which are operated in parallel, providing a circulation period of four hours per cycle with a total flow of 105 m$^3$/hour.

The treated water flows in on the longitudinal side; it is discharged into a settling tank over an overflow trough arranged at the top.

2.120 TREATMENT OF THE WATER 2.121 Procedure:

The procedure for the treatment of the water is subdivided into flocculation—filtration—oxidation—stage and disinfection.

2.122 Flocculation:

Flocculation is effected continuously, the flocculating agent (originally iron chloride and then aluminum sulfate and later on polyaluminum hydroxy chloride) being added continuously in measured quantities. At present the amount added is 1 ml PAC/m$^3$ of circulation.

2.123 Filtration:

A multilayer filter (quartz sand with hydroanthracite covering) is used. Its diameter is 2.0 m and its filter surface accordingly 3.1 m$^2$. From this, together with the circulation of 105 m$^3$/hour, there can be calculated a rate of filtration of 34 m/hour, thus complying with the Pool Hygiene Law.

Reverse flow is produced automatically via a difference-pressure control with timing.

2.124 Oxidation Stage:

This consists of an ozone system, a reaction and degasification part and an activated-charcoal filtration.

The ozone capacity is stated to be 100 g/hour or 1 g/m$^3$ of circulated water. The reaction time of 1.7 minutes (in the degasification container) is approximately in accord with present knowledge. The ozone which is removed is conducted over an ozone destroyer.

In the following activated-charcoal filter (filter area 2.5 m$^2$, filtration rate 42 m/hour), the ozone which is still dissolved after the degasification stage is removed from the water.

2.125 Disinfection:

Disinfection is assured by addition of an aqueous chlorine-granulate solution. As product there is used an organic chlorine substance (dichlorocyanurate) which, after consumption of the supply, is replaced by an inorganic compound (calcium hypochlorite) in order to satisfy the requirements of the Pool Hygiene Law, in accordance with which dichlorisocyanurate is not permitted as sole disinfectant for pools of a size of more than 130 m².

For detection of excess disinfectant use is made of the DPD method by which differentiation into free chlorine and combined chlorine is possible. As measurement instrument a colorimeter of suitable precision is used. The measurements are carried out at least three times a day and entered into an operating data book.

During the course of the experiment, the customary verifications carried out by the pool management were intensified or made more specific by suitable entries.

3.000 Procedure

3.100 Prerequisites 3.110 Monitoring:

In order to obtain the results of the individual measurements in reproducible form, continuously operating measuring instruments for free chlorine, pH and redox potential were installed. The test water for this was taken before the oxidation and chlorination.

The measurements and entries of the pool management itself were expanded and the data of the automatic measuring devices monitored by intensified control measurements.

In addition, samples were taken and subjected to more extensive examination in which particular attention was paid to possible optimalization of the quality of the pool water and particularly a reduction in the amount of chlorine (as a result of the use of the agent) while complying with the minimum and maximum values stipulated in the law.

3.111 Analytical Scope

In order to assure a minimum quality (also governed by law) for pool water, etc., Austrian law requires a certain minimum number of chemical analyses, which must be carried out both by the management itself and by the government supervisory authority.

At least pH, concentration of chlorine (free-active and bound-active by the DPD=diethyl-p.phenylenediamine method), content of oxidizable substances ($KMnO_4$ consumption), redox potential, nitrate content and chloride content may be mentioned. For this, the following values are permissible with due consideration of the method of water treatment selected:

| | |
|---|---|
| pH | 7.0–8.3 |
| chlorine, free | 0.3 mg/L minimum |
| chlorine, combined | 0.5 mg/L maximum |
| $KMnO_4$ consumption | 3.0 mg/L maximum above filling water |
| redox potential | 650 mV minimum |
| nitrate | 20 mg/L maximum above filling water |
| chloride | 100 mg/L maximum above filling water |

From a bacteriological standpoint the number of aerobic colonies must not amount to more than 300 in 1 ml; Escherichia coli must not be detectable in 100 ml. The examinations were directed at these requirements.

3.200 Test Variants

In order to test the optimum manner of adding the agent, different variants were selected in preliminary tests and attention also paid to the amount added.

As manners and quantities of addition there were selected:

| | | |
|---|---|---|
| (1.) | intermittently | |
| | (a) every second day | 10 L |
| | (b) once a day | 5 L |
| | (c) twice a day | 5 L |
| (2.) | continuously in parallel with the flocculating agent | | it being first of all found that addition doses which are closer together have a more definite effect than doses which are further apart.

This finding led to continuous dosing in parallel with the flocculating agent, due to which the latter could be reduced by more than 50% down to 0.4 ml/m³. For this, finally, a dose of 0.6 ml of agent per m³ of circulating water proved optimum.

With a daily circulation of 2400 m³ there can be calculated from this an addition of about 1.0 L of polyaluminum chloride (PAC) and 1.5 L of agent.

4.000 EVALUATION

4.100 ANALYTICAL VALUES

For evaluation the values indicated under 3.111, "Analytical Scope", were used and the influence of the agent then interpreted.

pH:

The pH before the start of the experiment was in the range of between 7.2 and 7.4. It did not experience any changes beyond this during the course of the tests.

Chlorine, free, active:

The proportion of free active chlorine was maintained, before the tests, with the agent at at least 0.4 to 0.6 mg/L. Thus it was possible to obtain and maintain a re-dox potential of about 700 (680 to 710 mV).

With the continuous addition of 0.6 ml of agent in parallel with 0.4 ml of PAC per m³ it was possible to increase the redox potential from about 700 to 750 mV within one day. This resulted in a reduction in the chlorine addition in the final analysis of more than 50% of the quantity originally necessary, namely to such an amount as still assured the maintaining of the required redox potential. In this way it was possible, with a content of 0.20 to 0.25 mg of free chlorine to maintain a redox potential of 710 mV, even in case of relative peak loads in the evening hours.

Chlorine, combined:

The content of combined chlorine was already low in this pool. During the experiments combined chlorine could be found only in very slight amounts—in no case more than 0.1 mg/Liter.

$KMnO_4$ consumption:

Before the carrying out of the experiments this was between 3 and 4 mg/L absolute and thus less than that of the filling water. Even with the reduction of the addition of chlorine to 0.2 mg/L no change beyond 4 mg/L occurred and it continued to be between 3 and 4 mg/L.

Redox potential:

As already described under "Chlorine, free, active" it was possible, with the use of the agent and despite a reduction in the dose of chlorine by more than 50%, to assure a redox potential of 700 to 710 mV. For further information see further above under "Chlorine."

Nitrate:

The nitrate contents were in all cases below 20 mg/L (11-19 mg/L) and thus in all cases within the requirements of "20 mg/L below that of the filling water" which had contents of 6 to 14 mg/L.

Chloride:

The value of the filling water (5 to 12 mg/L) may not be exceeded by more than 100 mg/L in accordance with the regulations of the Pool Hygiene Law. The amounts found during the series of experiments were between 120 and 135 mg/L, whereby the maximum value is (slightly) exceeded.

The (preliminary) bacteriological examinations effected by the pool management itself showed excellent results even with only 0.2 mg/L of chlorine and a load about 50% greater than the rated load (88 persons as compared with 60). The largest number of aerobic colonies was 20/ml. Escherichia coli, which are not to be detectable in 100 ml, could not be noted in any case.

Additional chemicals, disinfectants, etc., other than those mentioned did not have to be used during the time of the experiment.

Furthermore, the effectiveness of the agent which has been prepared in accordance with the invention was determined for use in an open body of utility-water. The agent prepared in accordance with Example 1 was used in this test also.

The open body of water in which the activity was tested is an artifically formed pond which lies in the center of a loosely built-up week-end colony at Lassee in Lower Austria.

The dimensions of "Pond VII," as it is known locally, were about 300×60 m, with a maximum depth of about 3 m; the volume is thus about 50,000 m$^3$. No artificially formed inlets are present; neither toilet water nor other waste waters are introduced by the adjoining houses.

The bank and the bottom are not artificially compacted but the retaining walls of most of the lots of land are, however, in the vicinity of the bank. The water level is somewhat below the adjoining plots. The pond is stocked with fish; there is swimming at times.

During the course of the last years there has been an increasing impairment in the quality of the water, expressed primarily by turbidity, reduction of the depth of view to about 30-40 cm and excessive growth of algae (primarily on the rocks in the region of the bank) as well as by, at times, an unpleasant odor.

The pond was first of all treated by spraying 1000 L of agent via a pressure nozzle over the surface of the water. This process was repeated after 3 weeks with 500 L of agent. The amount of agent used was thus about 1500 L for 50,000 m$^3$, resulting in an amount of 30 mg/L.

The following chemical and physical parameters were considered for judging the effectiveness: temperature, pH, depth of view, total hardness, carbonate hardness, non-carbonate hardness, potassium-permanganate consumption (oxidizability), chloride, nitrate, nitrite, phosphate (total), sulfate, ammonium, iron, and oxygen content and consumption (in individual cases). In individual cases also the number of colonies in 1 ml as well as coliform bacteria and Escherichia coli in 100 ml were determined.

A sample taken before the first treatment (A) showed the following characteristics for the organic and nutrient load:

| | |
|---|---|
| $KMnO_4$ consumption | 19 mg/L |
| nitrate $NO_3$ | 41 mg/L |
| phosphate (P-total) | 31 mg/L |
| ammonium $NH_3$ | 0.05 mg/L |
| depth of view | 40 cm |

After the first spraying (B), samples were again taken and examined at intervals of 3 hours, 4 days (C), 3 weeks (D) and 6 weeks (E).

| | A | B | C | D | E |
|---|---|---|---|---|---|
| $KMnO_4$ consumption mg/L | 19 | 15 | 13 | 11 | 10 |
| Nitrate $NO_3$ mg/L | 41 | 27 | 20 | 13 | 14 |
| Phosphate P (total) mg/L | 31 | 27 | 25 | 18 | 19 |
| Ammonium $NH_3$ mg/L | 0.05 | 0.05 | 0.05 | 0.05 | 0.05 |
| Depth of view cm | 40 | 40 | 80 | 110 | 120 |
| Oxygen $O_2$ mg/L | | | | 10.5 | |
| Oxygen consumption mg/L | | | | 0.8 | |
| Oxygen saturation mg/L | | | | 9.1 | |

In the case of sample D (after three weeks) there were furthermore determined:

| | |
|---|---|
| number of colonies | 875 |
| coliform bacteria | 212 |
| *Escherichia coli* | 86 |

From the results of these analyses it can be noted that after the use of the agent there was a noticeable improvement in the quality of the water.

Aside from the fact that, purely visually, a change in depth of view from 0.4 to 1.2 m was obtained, both the $KMnO_4$ consumption and the phosphate and nitrate contents showed substantial reductions, which can be explained in the manner that these injurious substances are deposited or adsorbed on the flocculation formed, as has been described above.

With the reduction in nutrient substances obtainable in this way, in this case the phosphates and/or nitrates which are coresponsible for a eutrophication of the water, there are thus created good prerequisites for suitably preventing possible growth of algae, with the phenomena inherent therein such as reduced depth of vision, etc.

The fact that, in parallel with this, certain significant chemical values change can, to be sure, not be noted by the naked eye but it affords the analyst the possibility of a suitable technically directed evaluation.

A few examples of the method of the invention are given below:

EXAMPLE 1

0.6 kg of CaO (quicklime, unslaked lime) were added in a kettle to 390 liters of water over the course of one hour, with agitation. Furthermore, 7 kg of drill cuttings (analysis sample 1) having an NaCl content of 48% were added. The mixture was then stirred for three hours. After completion of the stirring, 406 liters of crude brine (28% NaCl) were added. The resultant mixture was again stirred for two hours. The pH was then brought to the desired final value of 9.85. After sedimentation of the undissolved portions for a period of 5 to 10 hours the solution was poured off.

The final product had the following properties:
Appearance: Colorless, clear liquid
Odor: Odorless
Taste: Salty-bitter
Reaction: Alkaline, pH 9.85 (undiluted)
Density: 1.13 g/cm$^3$ at 20° C.

EXAMPLE 2

195 liters of water were introduced into a kettle. 0.6 kg of CaO (quicklime, unslaked lime) were added over the course of an hour with stirring. Thereupon, depending on the NaCl content, which in principle is inversely proportional to the silicate content, 2 to 7 kg of drill cuttings were added. If the NaCl content of the drill cuttings is 20%, 2 kg are added; if it is 80%, 7 kg of drill cuttings are added. After addition of 195 liters of water, the mixture thus obtained was again stirred for two hours. The pH was brought to the desired final value of 9.5 to 10.5. (If this value is not reached it is established by the addition of quicklime or hydrochloric acid). After settling of the insoluble portion for a period of about 5 to 10 hours—until the solution is clear—the solution was poured off.

EXAMPLE 3

While retaining basically the same manner of operation as indicated in Example 2, the alkaline solution or suspension (water and quicklime) was treated with 1 kg of rock-salt deads having an NaCl content of practically zero, instead of drill cuttings. After stirring, 406 L of crude brine containing 28 wt% NaCl were added, followed then by treatment in the manner indicated in Example 2.

I claim:

1. A method of producing a liquid agent for improving the quality of contaminated water, particularly water in pools, natural bodies of water and waste waters, characterized by introducing with agitation comminuted rock-salt clay or a mixture thereof with rock-salt deads into an aqueous solution or suspension of an inorganic base, stirring the resultant mixture for 2 to 5 hours, thereupon adjusting the pH of the resultant solution to a value of between 7.5 and 10.5 by means of the addition of acid or alkali, and removing undissolved portions from the solution.

2. A method according to claim 1, characterized by the use of an aqueous solution or suspension having a pH of more than 10.

3. A method according to claim 1 or 2, characterized by the fact that solid substances (rock-salt clay, rock-salt deads or mixtures thereof) whose NaCl content is between 20 and 80 wt% are introduced into the solution.

4. A method according to claim 1, characterized in the fact that before the adjustment of the pH to the desired final value the sodium-chloride content of the solution is increased to the desired value of 14 g NaCl per liter of solution by addition of sodium chloride.

5. A method according to claim 4, characterized by the fact that sodium chloride is added in the form of an aqueous solution.

6. A method according to claim 4 or 5, characterized by the fact that after the addition of the sodium chloride water is possibly further added to the mixture and that thereupon stirring is effected for one to four hours.

7. A method according to claim 1, characterized by the fact that the quantity of solids added to the alkaline solution is based on the sodium-chloride content of said solids, 1 kg of solids having a sodium-chloride content of 0% to 7 kg of solids having a sodium-chloride content of 80% being added to every 180 to 200 liters of alkaline solution.

8. The method according to claim 1, wherein said stirring is performed for 3 hours.

9. The method according to claim 1, wherein the pH is adjusted to a value between 9.5 and 10.5.

10. The method according to claim 2, wherein said aqueous solution or suspension has a pH of more than 12.

11. The method according to claim 5, wherein said aqueous solution of sodium chloride is crude brine.

12. The method according to claim 5, wherein said aqueous solution of sodium chloride contains 28% NaCl.

* * * * *